United States Patent
Kuwahata et al.

(10) Patent No.: US 7,354,970 B2
(45) Date of Patent: *Apr. 8, 2008

(54) POLYVINYL CHLORIDE COPOLYMER PASTE RESIN, COMPOSITION THEREOF, AND METHOD FOR MAKING THE RESIN

(75) Inventors: Mitsuyoshi Kuwahata, Takasago (JP);
Shinbe Matsuzaki, Takasago (JP);
Toshihito Kawauchi, Kobe (JP);
Nobuki Toba, Ibaraki (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/513,676

(22) PCT Filed: Jun. 10, 2003

(86) PCT No.: PCT/JP03/07386

§ 371 (c)(1),
(2), (4) Date: Jun. 2, 2005

(87) PCT Pub. No.: WO2004/003042

PCT Pub. Date: Jan. 8, 2004

(65) Prior Publication Data

US 2005/0209424 A1    Sep. 22, 2005

(30) Foreign Application Priority Data

Jun. 28, 2002  (JP) .............................. 2002-190950
May 9, 2003   (JP) .............................. 2003-132118

(51) Int. Cl.
*C08L 27/06* (2006.01)
*C08F 265/04* (2006.01)

(52) U.S. Cl. .................. 524/569; 521/73; 524/504; 524/568; 525/78; 525/85; 525/317

(58) Field of Classification Search ................ 525/317, 525/239, 78, 85; 524/569, 568, 504; 521/73
See application file for complete search history.

(56) References Cited

U.S. PATENT DOCUMENTS

| 4,988,768 A | | 1/1991 | Gola et al. | |
| 5,117,151 A | * | 5/1992 | Sluyterman et al. | ........ 313/413 |
| 5,155,189 A | * | 10/1992 | Skillicorn et al. | .......... 526/199 |
| 5,177,151 A | | 1/1993 | Yu | |
| 6,583,221 B1 | | 6/2003 | Omura et al. | |

FOREIGN PATENT DOCUMENTS

| EP | 0483051 A1 | 4/1992 |
| EP | 0520668 A1 | 12/1992 |
| JP | 02-300685 | 6/1992 |
| JP | 04253751 | 9/1992 |
| WO | WO 02/079324 | 10/2002 |

OTHER PUBLICATIONS

English language translation of JP 03-0160003 published Jul. 10, 1991.*
English language translation of JP 02-263810, published Oct. 26, 1990.*
English language translation of JP 04-253751, publication date: Sep. 9, 1992.*
Supplementary EP Search Report No. 03736146, issued Jun. 14, 2006.

* cited by examiner

*Primary Examiner*—Fred Teskin
(74) *Attorney, Agent, or Firm*—Kenyon & Kenyon LLP

(57) ABSTRACT

A novel polyvinyl chloride copolymer paste resin comprising a copolymer of a vinyl chloride monomer and a macromonomer of the present invention can be synthesized with high productivity, and can provides a plastisol having high gelation properties, storage stability, superior tensile properties in low-temperature working conditions and heat resistance.

20 Claims, 9 Drawing Sheets

POLYVINYL CHLORIDE COPOLYMER PASTE RESIN, COMPOSITION THEREOF, AND METHOD FOR MAKING THE RESIN

This application is a 371 national phase application of PCT/JP2003/007386 filed on 10 Jun. 2003, claiming priority to JP 2002-190950 filed on 28 Jun. 2002, and JP2003-132118 filed on 09 May 2003, the contents of which are incorporated herein by reference in their entirety.

TECHNICAL FIELD

The present invention relates to a novel copolymer of a vinyl chloride monomer and a macromonomer having a vinyl polymer main chain. In particular, it relates to a novel polyvinyl chloride copolymer resin for making paste (hereinafter referred to as "polyvinyl chloride copolymer paste resin") that exhibits superior plastisol gelation properties, plastisol storage stability, tensile properties in low-temperature-processing conditions, and heat stability, and to a method for making the same.

BACKGROUND ART

Vinyl chloride resins have excellent mechanical and chemical properties and are used for various purposes since they can be formed into rigid or nonrigid products when used with plasticizers.

In particular, a polyvinyl chloride resin for paste applications, hereinafter referred to as the "polyvinyl chloride paste resin", is generally composed of particles having a diameter of 0.1 to 70 μm and is often used in the form of a plastisol prepared by dispersing the resin dried by spray drying or the like into a plasticizer to provide flowability. The plastisol composed of the paste resin can be subjected to various molding processes such as spread coating, dip coating, rotary screen printing, and spray coating, and can be easily formed into a nonrigid product by heating after shaping. Accordingly, the plastisol composed of the paste resin is widely used for various applications such as floor covering and wall paper in building materials, underbody coating and sealer in automotive materials, tarpaulins, and gloves.

A vinyl chloride/vinyl acetate copolymer resin prepared by copolymerizing vinyl chloride with vinyl acetate has been widely used for making products under low-temperature-processing conditions. Whereas the vinyl chloride/vinyl acetate copolymer resin has superior plastisol gelation properties and superior tensile properties in low-temperature-processing conditions, storage stability of plastisols and heat storage stability of the products therefrom are unsatisfactory.

Besides the vinyl chloride/vinyl acetate copolymer resin, the following methods using a paste resin for low-temperature-processing have also been suggested.

(1) A polymer blending method, which comprises blending a vinyl chloride polymer with a vinyl polymer having a low glass transition temperature, can improve the gelation properties of the plastisol. However, the storage stability and the heat stability are notably poor, and a homogeneous resin phase is hardly attainable. Thus, the tensile properties under the low-temperature-processing conditions are often poor.

(2) A method which involves making a copolymer of a vinyl chloride monomer and a monomer of a vinyl polymer having a low glass transition temperature (Japanese Unexamined Patent Application Publication No. 63-23947) improves the gelation properties of the plastisol. However, due to the difference among monomers in the polymerization kinetics, homopolymers therefrom tend to be formed. Moreover, the presence of a low molecular weight homopolymer may degrade the properties such as the storage stability, heat stability, and tensile properties in low-temperature-processing conditions.

(3) In a method which comprises graft polymerizing a vinyl chloride monomer onto a vinyl polymer using a cross-linking agent, e.g., a polyfunctional monomer or the like (Japanese Unexamined Patent Application Publication No. 63-264654), the productivity must be significantly decreased in order for the cross-linking agent to fully work. Moreover, an unreacted cross-linking agent degrades the storage stability and heat stability.

In other words, the methods described in paragraphs (1) to (3) can improve the gelation properties of the plastisol and the tensile properties of the product under the low-temperature-processing conditions but suffer from problems such as poor storage stability of the plastisol and poor heat stability of the product.

A method that uses a pyrolytic organic foaming agent such as azodicarbonamide or oxybis(benzosulfony hydrazide) is commonly used to make nonrigid polyvinyl chloride foams. Polyvinyl chloride copolymer resins, however, have low melt viscoelasticity around the decomposition temperature of the foaming agent. Thus, coalescence of cells of the foams or inability to maintain thickness due to failure in keeping the generated gas (permanent set) may result.

On the other hand, it is widely known that graft copolymers with relatively highly controlled structures and compositions can be made using macromonomers.

However, as disclosed in Japanese Unexamined Patent Application Publication No. 4-173818 and U.S. Pat. No. 5,177,151, although application of such graft copolymers as an additive to a matrix resins is common, no example that uses a copolymer as the main component of paste resins has been reported.

Moreover, as disclosed in Japanese Unexamined Patent Application Publication No. 4-173818, although application of such graft copolymers from macromonomers into agents for modifying friction resistance of nonrigid polyvinyl chloride is known, no example that intentionally uses such graft copolymer as an additive for accelerating internal plasticization to improve modulus of elasticity and flowability are known. This is due to the difficulty of stably producing a graft copolymer from a macromonomer achieving good handling property for the graft copolymer which has a high compatibility with the polyvinyl chloride matrix resin, into which the graft copolymers are added thereafter.

On the other hand, use of paste resins as additives for rigid/nonrigid polyvinyl chlorides is widely known. However, the effect of improving flowability or promoting internal plasticization is small. Liquid plasticizers or different types of polymer may sometimes be added, but the effect is insufficient if added in small amounts.

SUMMARY OF THE INVENTION

An object of the present invention is to provide a novel polyvinyl chloride paste copolymer resin that can be manufactured with high productivity and that has superior plastisol gelation property, plastisol storage stability, and tensile property in low temperature processing conditions.

Through extensive investigations, the present inventors have found that the above-described problems can be solved by using a macromonomer with a controlled molecular distribution and polymer end groups, and have made the present invention based on the finding.
(1) An aspect of the present invention provides a polyvinyl chloride copolymer resin for paste applications, comprising a copolymer of a vinyl chloride monomer and a macromonomer having a vinyl polymer main chain.
(2) In the above polyvinyl chloride copolymer resin of (1), the macromonomer having the vinyl polymer main chain may include a monomer having at least one polymerizable group containing a polymerizable carbon-carbon double bond at an end thereof.
(3) In the above polyvinyl chloride copolymer resin of (1) or (2), the macromonomer having at least one polymerizable, group containing a polymerizable carbon-carbon double bond at the end, may be synthesized by radical polymerization.
(4) In the above polyvinyl chloride copolymer resin of any one of (1) to (3), the polymerizable group containing the polymerizable carbon-carbon double bond of the macromonomer may have a structure represented by the general formula:

—OC(O)C(R)=CH$_2$ (wherein R represents hydrogen or a C1-C20 organic group).
(5) In the above polyvinyl chloride copolymer resin of any one of (1) to (4), R may represent hydrogen or a methyl group.
(6) In the above polyvinyl chloride copolymer resin of any one of (1) to (5), the vinyl polymer main chain of the macromonomer may be prepared by living radical polymerization.
(7) In the above polyvinyl chloride copolymer resin of any one of (1) to (6), the polymer main chain of the macromonomer may be a (meth)acrylic polymer.
(8) In the above polyvinyl chloride copolymer resin of any one of (1) to (7), the polymer main chain of the macromonomer may be a (meth)acrylic ester polymer.
(9) In the above polyvinyl chloride copolymer resin of any one of (1) to (8), wherein the polymer main chain of the macromonomer may be an acrylic ester polymer.
(10) In the above polyvinyl chloride copolymer resin of any one of (1) to (9), the ratio (Mw/Mn) of the weight-average molecular weight (Mw) to the number-average molecular weight (Mn) of the macromonomer may be less than 1.8.
(11) In the above polyvinyl chloride copolymer resin of any one of (1) to (10), the glass transition temperature of the macromonomer may be −20° C. or less.
(12) In the above polyvinyl chloride copolymer resin of any one of (1) to (11), the copolymer may contain 80 to 99.95 percent by weight of the vinyl chloride monomer and 20 to 0.05 percent by weight of the macromonomer.
(13) Another aspect of the present invention provides a method for synthesizing the polyvinyl chloride copolymer resin according to one of above (1) to (12) above, wherein the vinyl chloride monomer is polymerized with the macromonomer by aqueous polymerization.
(14) Another aspect of the present invention provides a method for synthesizing the polyvinyl chloride copolymer resin according to one (1) to (13) above, wherein the vinyl chloride monomer is polymerized with the macromonomer by at least one of emulsion polymerization, suspension polymerization, and microsuspension polymerization.
(15) Another aspect of the present invention provides a plastisol composition exhibiting superior gelation property and high storage stability, the plastisol composition comprising (A), (B), and (C) below: (A) 100 parts by weight of a vinyl chloride polymer containing 20 to 100 percent by weight of the polyvinyl chloride copolymer resin according to one of claims (1) to (14) and 80 to 0 percent by weight of a vinyl chloride homopolymer resin; (B) 30 to 200 parts by weight of a plasticizer; and (C) 0 to 500 parts by weight of a filler.
(16) The plastisol composition of (15) above may further contain 0.1 to 10 parts by weight of a chemical foaming agent, wherein the plastisol is heated to form uniform micro-cells, whereby the composition further exhibits excellent foam properties.
(17) Another aspect of the present invention provides a resin for canvas and glove applications, prepared by drying an aqueous dispersion mixture of 20 to 100 percent by weight of the polyvinyl chloride copolymer resin according to one of (1) to (14) above; and 80 to 0 percent by weight of a vinyl chloride homopolymer resin.
(18) Another aspect of the present invention provides a polyvinyl chloride rigid resin composition, comprising 0.1 to 50 percent by weight of the polyvinyl chloride copolymer resin according to one of claims (1) to (14); and 99.9 to 50 percent by weight of a vinyl chloride homopolymer resin, whereby the processability is improved, and internal plasticization is achieved without a plasticizer.

DETAILED DESCRIPION

The vinyl chloride monomer used in the present invention may be of any type. For example, the vinyl chloride monomer may be a vinyl chloride monomer, a vinylidene chloride monomer, or a mixture of these. The vinyl chloride monomer may additionally contain at least one monomer that is copolymerizable with the vinyl chloride monomer and that is preferably free of reactive functional groups in the main chain after polymerization. Examples of such a monomer include α-olefins such as ethylene and propylene and the mixture thereof. When such additional monomer is used, the amount of vinyl chloride monomer is preferably at least 50 percent by weight, and more preferably at least 70 percent by weight.

A macromonomer is a high-molecular weight monomer consisting of monomers of a single type and has at least one polymerizable functional group at one end thereof. The number-average molecular weight of the macromonomer may be any but is preferably in the range of 1,000 to 200,000. The macromonomer having the vinyl polymer main chain used in the present invention is prepared by radical polymerization of monomers, and the resultant macromonomer contains at least one group comprising polymerizable carbon-carbon double bond at one end. Examples of the functional group include aryl, vinylsilyl, vinyl ether, and dicyclopentadiene. The functional group preferably includes a polymerizable carbon-carbon double bond and is preferably represented by the general formula:

—OC(O)C(R)=CH$_2$

In the formula, R may be any, but is preferably selected from the group consisting of —H, —CH$_3$, —CH$_2$CH$_3$, —(CH$_2$)$_n$CH$_3$ (n is an integer between 2 and 19), —C$_6$H$_5$, —CH$_2$OH, and —CN. More preferably, R is —H or —CH$_3$.

The vinyl polymer constituting the main chain of the macromonomer used in the present invention is prepared by radical polymerization. Radical polymerization processes can be classified into "ordinary radical polymerization"

processes and "controlled radical polymerization" processes. In ordinary radical polymerization processes, a monomer with a predetermined functional group is simply copolymerized with a vinyl monomer in the presence of a polymerization initiator. In controlled radical polymerization processes, predetermined functional groups are introduced into controlled positions, such as ends.

According to the ordinary radical polymerization processes, monomers with predetermined functional groups are stochastically introduced into the polymer. A large amount of monomer must thus be fed to prepare a highly functionalized polymer. Since the process is a type of free radical polymerization, the molecular weight distribution is wide and the resulting polymer has high viscosity.

The controlled radical polymerization processes can be further classified into "chain transfer" processes and "living radical polymerization" processes. In chain transfer processes, a chain transfer agent with a predetermined functional group is used in polymerization to synthesize a vinyl polymer having a functional group at the end. In living radical polymerization processes, the end of propagation continues to grow without inducing termination reactions, thereby synthesizing a polymer with a target molecular weight.

Chain transfer processes can synthesize highly functionalized polymers but require chain transfer agents having particular functional groups with respect to initiators. Moreover, as in the ordinary radical polymerization processes described above, the process is a type of free radical polymerization; hence, the molecular weight distribution is wide and it is difficult to obtain polymers to have low viscosity.

As disclosed in WO 99/65963, unlike these polymerization processes, a living radical polymerization process exhibits a high rate of polymerization, and a termination reaction rarely occurs although radical polymerization in general is difficult to control because of easy termination of the reaction resulted from coupling reaction among radicals. The living radical polymerization process can produce a polymer with a narrow molecular weight distribution, e.g., Mw/Mn of approximately 1.1 to 1.5. The molecular weight can be controlled by adjusting the feed ratio between the monomer and the initiator.

Since the living radical polymerization process can produce a polymer with a narrow molecular distribution and low viscosity, and can introduce monomers with predetermined functional groups into the target positions of the polymer, the process is preferable for synthesizing the vinyl polymer with the predetermined functional group of the present invention.

Living radical polymerization processes have been increasingly investigated by various study groups. For example, a process using a cobalt porphyrin complex is disclosed in J. Am. Chem. Soc., 1994, vol. 116, p. 7943; and a process using a radical scavenger such as a nitroxide radical is disclosed in Macromolecules, 1994, vol. 27, p. 7288. Moreover, an atom transfer radical polymerization (ATRP) using a halogenated organic compound or the like as an initiator and a transition metal complex as a catalyst has also been studied.

Among the living radical polymerization processes, an ATRP process for synthesizing vinyl monomers using a halogenated organic compound, a halogenated sulfonyl compound, or the like as an initiator and a transition metal complex as a catalyst is particularly preferable for synthesizing vinyl polymers having predetermined functional groups. This is due to the fact that the ATRP process has not only the advantages of the living radical polymerization described above, but also high flexibility in designing the initiator or the catalyst since halogen, which contributes significantly to functional group transformation, is at an end. Examples of the ATRP processes are disclosed in Matyjaszewski et al., J. Am. Chem. Soc. 1995, vol. 117, p. 5614; Macromolecules, 1995, vol. 28, p. 7901; Science, 1996, vol. 272, p. 866; WO 96/30421; WO 97/18247; WO 98/01480; WO 98/40415; Sawamoto et al., Macromolecules, 1995, vol. 28, p. 1721; Japanese Unexamined Patent Application Publication No. 9-208616; and Japanese Unexamined Patent Application Publication No. 8-41117.

Any of these methods may be employed to synthesize the macromonomer of the present invention. Controlled radical polymerization is normally employed, and living radical polymerization is preferred for its high controllability. The atom transfer radical polymerization is most preferred. The monomer that constitutes the main chain of the vinyl polymer of the macromonomer may be of any type. Examples of the monomer include (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; styrenic monomers such as styrene, vinyltoluene, α-methylstyrene, chlorostyrene, styrenesulfonic acid, and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; allyl chloride; and allyl alcohol. These may be used alone or in combination by copolymerization. From the viewpoint of the physical properties of the resultant products, styrenic monomers and (meth)acrylic monomers are preferable. In particular, acrylic ester monomers and (meth)acrylic ester monomers are preferred, acrylic ester monomer is more preferable, and butyl acrylate is most preferable. In the present invention, each of these preferable monomers may be copolymerized with another monomer or other monomers. In such a case, the content of the preferable monomer is preferably 40 percent by weight.

Ends of vinyl chloride copolymers containing vinyl polymers other than vinyl chloride polymers synthesized by controlled radical polymerization, i.e., other than living radical polymerization, are never completely copolymerized with the vinyl chloride resin. Thus, stability in the viscosity is rarely achieved due to the presence of the unreacted vinyl polymers contained in the copolymer. Moreover, the unreacted vinyl polymers, which are inhomogeneously distributed in the resin, degrade the physical properties, such as tensile strength, in the low-temperature-processing conditions. Accordingly, macromonomers synthesized by living radical polymerization, the ends of which are substantially completely copolymerized with the vinyl chloride resin, are preferably used.

The glass transition temperature of the macromonomer is preferably −20° C. or less. When the glass transition temperature exceeds −20° C., the glass transition temperature of the resin cannot be decreased sufficiently, resulting in insufficient molecular motion, insufficient swelling, and difficulty of introducing a plasticizer under low calorie. As a result, the gelation properties of the plastisol are degraded, and improvements in sheet properties cannot be expected.

In the present invention, the macromonomer having the vinyl polymer main chain preferably has such a molecular weight distribution that the ratio of the weight-average molecular weight to the number-average molecular weight is less than 1.8 when measured by gel permeation chromatography (GPC). The ratio is preferably 1.6 or less, and more preferably 1.4 or less. In conducting gel permeation chromatography in the present invention, polystyrene gel columns or the like are used with chloroform, tetrahydrofuran, or the like as a mobile phase, and the molecular weight is reported on a polystyrene equivalent. A macromonomer having a vinyl polymer main chain having a wide molecular distribution may suffer from nonuniform progress of copolymerization reactions with the vinyl chloride monomer, and unreacted macromonomers may remain as a result. In other words, the storage stability of the plastisol may be degraded, and the strength at break may be decreased.

The number-average molecular weight of the macromonomer having the vinyl polymer main chain of the present invention may be any, but is preferably 500 to 100,000, more preferably 3,000 to 40,000, and most preferably 3,000 to 20,000. At a number-average molecular weight of less than 400, the vinyl copolymer does not fully exhibit its potential characteristics. At a number-average molecular weight of more than 100,000, handling property is deteriorated, and copolymerization may be inhibited due to insufficient dissolution of the macromonomer into the vinyl chloride monomer.

The polyvinyl chloride copolymer paste resin of the present invention preferably contains 80 to 99.95 percent by weight of the vinyl chloride monomer and 20 to 0.05 percent by weight of the macromonomer. When the content of macromonomer is less than 0.05 percent by weight, degradation in tensile properties under low-temperature-processing conditions may result. When the content thereof exceeds 20 percent by weight, the polymerization reaction becomes unstable, thereby resulting in failure in synthesizing the polyvinyl chloride copolymer paste resin of the present invention.

The degree of polymerization or the average molecular weight of the polyvinyl chloride copolymer paste resin of the present invention may be any. When the synthetic resin is a vinyl chloride homopolymer or a copolymer containing vinyl chloride as the main component, the K value measured according to Japanese Industrial Standards (JIS) K 7367-2 is preferably in the range of 50 to 95, and more preferably 60 to 80.

In the present invention, the polyvinyl chloride copolymer paste resin is preferably synthesized by aqueous polymerization due to its high controllability in polymerization. For example, suspension polymerization, microsuspension polymerization, or emulsion polymerization may be employed. In particular, the suspension polymerization and the microsuspension polymerization are preferred from the viewpoint of particle size control.

The average diameter of the primary particles of the polyvinyl chloride copolymer paste resin of the present invention is normally 0.1 to 70 μm, and preferably 0.1 to 50 μm. The resin is granulated to increase the bulk density before shipping. The average diameter of the secondary particles after granulation is normally 50 to 500 μm.

The polyvinyl chloride copolymer paste resin (primary particles) of the present invention may be used alone or in combination with at least one vinyl chloride homopolymer resin. When used alone, the resin preferably has a unimodal or multimodal particle size distribution with the main peak in the range of 0.1 μm to 10 μm, and more preferably 0.3 to 7 μm, and most preferably 0.1 μm to 10 μm. In order to further enhance the flowability, the polyvinyl chloride copolymer paste resin of the present invention that has a particle diameter distribution in the range of 0.1 to 10 μm may be mixed with a separately prepared finer polyvinyl chloride copolymer paste resin of the present invention having a particle diameter distribution with the main peak in the range of 0.05 to 0.5 μm or with a separately prepared coarser polyvinyl chloride copolymer paste resin of the present invention having a particle diameter distribution with the main peak in the range of 10 to 70 μm, preferably in the range of 10 to 50 μm.

In order for the plastisol to achieve high flowability, the content of the vinyl chloride homopolymer resin can be used together with the polyvinyl chloride copolymer paste resin of the present invention preferably in an amount of 0 to 80 percent by weight, more preferably 0 to 50 percent by weight, and most preferably 0 to 30 percent by weight.

When the content of the vinyl chloride homopolymer resin exceeds 80 percent by weight, gelation properties is decresed in the uniformity of gels, resulting in degradation in low-temperature properties and in heat stability (initial coloring time).

For use in canvases and gloves, an aqueous dispersion of polyvinyl chloride copolymer paste resin may be blended with an aqueous dispersion of vinyl chloride homopolymer resin, and the resulting blend may be dried for use in canvases and gloves. In such a case, 0 to 80 percent by weight, more preferably 0 to 50 percent by weight and most preferably of the vinyl chloride homopolymer resin relative to the polyvinyl chloride copolymer paste resin is preferably added as the resin solid content, and the mixture is preferably dried before use.

When the content of the vinyl chloride homopolymer resin exceeds 80 percent by weight, dried secondary particles in a plastisol state may easily return to primary particles, and the plastisol applied to a surface of a cloth (base cloth) may easily permeate toward the back surface of the cloth resulting in insufficient resin layer, which is undesirable.

Examples of the plasticizer for the plastisol include phthalic ester plasticizers such as di-2-ethylhexyl phthalate (DOP), di-n-octyl phthalate (DOP), diisononyl phthalate (DINP), dibutyl phthalate (DBP), and the like; phosphoric ester plasticizers such as tricresyl phosphate (TCP), trixylyl phosphate (TXP), triphenyl phosphate (TPP), and the like; fatty ester plasticizers such as di-2-ethylhexyl adipate (DEHA), di-2-ethylhexyl sebacate, and the like. These may be used alone or in combination.

The amount of plasticizer is preferably 30 to 200 parts by weight relative to 100 parts by weight of the vinyl chloride resin containing the vinyl chloride copolymer resin and the vinyl chloride homopolymer resin. At an amount of less than 30 parts by weight, the plastisol does not exhibit sufficient flowability. At a content exceeding 200 parts by weight, the gelation properties may be notably degraded.

Examples of the filler include calcium carbonate, magnesium carbonate, lithium carbonate, kaolin clay, gypsum, mica, talc, magnesium hydroxide, calcium silicate, and borax. Preferably, 0 to 500 parts by weight of the filler is used relative to 100 parts by weight of the vinyl chloride resin. Use of more than 500 parts by weight of the filler results in a decrease in flowability and foam properties of the plastisol.

The chemical foaming agent may be any known agent. Examples thereof include azodicarbonamide, N,N'-dinitrosopentamethylenetetramine, 4,4'-oxybis(benzenesulphonylhydrazide), and hydrazodicarbonamide.

The amount of pyrolytic foaming agent depends on the thickness and the expansion ratio of the foam. Preferably, 0.1 to 10 parts by weight, and more preferably 1 to 7 parts by weight of the foaming agent is used relative to 100 parts by weight of the vinyl chloride resin. At an amount of less than 1 parts by weight, a sufficient expansion ratio cannot be achieved. At an amount more than 10 parts by weight, undecomposed foaming agent remains, resulting in undesirable coloration or nonuniform foaming, which is undesirable.

The plastisol composition may contain a foam stabilizer (kicker) containing Ba—Zn, Na—Zn, Ba—Ca—Zn, or other metals in addition to the above-described essential ingredients. The plastisol may additionally contain one or more known additives such as a vinyl chloride stabilizer, a coloring agent (pigment) such as titanium white, a flame retarder, an antioxidant, an antistatic agent, and processing aids and modifiers.

When the polyvinyl chloride copolymer paste resin is used as a processing agent of rigid vinyl chloride and the like, the amount of polyvinyl chloride copolymer paste resin is preferably 0.1 to 50 percent by weight, more preferably 1 to 30 percent by weight, and most preferably 5 to 20 percent by weight of the rigid vinyl chloride resin. The polyvinyl chloride copolymer paste resin does not significantly improve the flowability if the content thereof is less than 0.1 percent by weight. At a content exceeding 50 percent by weight, internal plasticization is accelerated, thereby drastically decreasing the mechanical strength and making the resulting resin unsuitable for use in a rigid vinyl chloride product.

BEST MODE FOR CARRYING OUT THE INVENTION EXAMPLES

Figure 1:
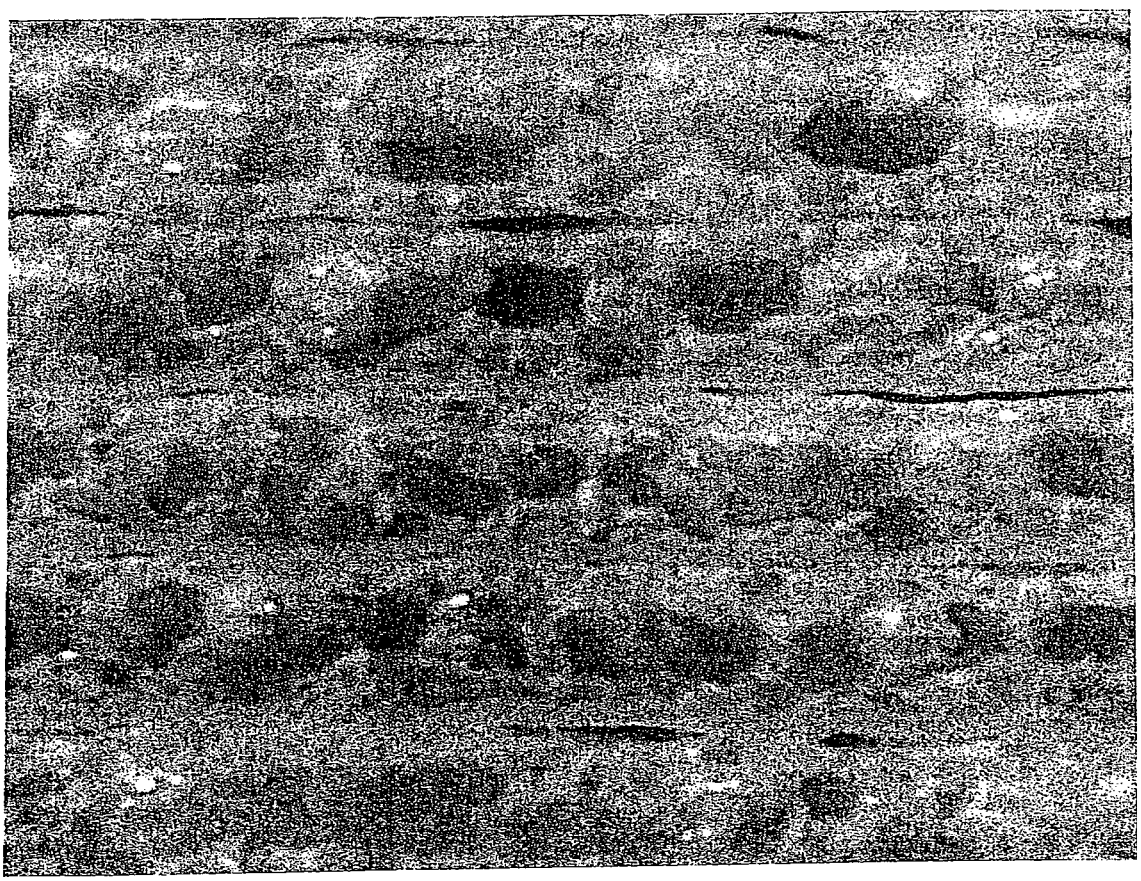
FIG. 1 is a cross-sectional photograph of a sheet of EXAMPLE 9 for evaluating the foaming properties.

The present invention will now be described in detail by EXAMPLES. However, the scope of the present invention is not limited to these examples. In EXAMPLES, "part(s)" means "part(s) by weight" and "%" means "percent by weight".

<Synthesis of a Macromonomer Having a Vinyl Polymer Main Chain>

A macromonomer having a vinyl polymer main chain was prepared as follows.

Production Example 1

A 2-L separable flask equipped with a reflux condenser and a stirrer was charged with CuBr (5.54 g), and the reactor was purged with nitrogen. Acetonitrile (73.8 ml.) was added, and the mixture was stirred for 30 minutes in a 70° C. oil bath. Butyl acrylate (132 g), methyl 2-bromopropionate (14.4 ml) and pentamethyldiethylenetriamine (4.69 ml) were added to the mixture to initiate the reaction. While heating at 70° C. with stirring, butyl acrylate (528 g) was added dropwise over 90 minutes, and the mixture was heated with stirring for 80 minutes.

The reaction mixture was diluted with toluene and was passed through an activated alumina column. The volatile components were removed by distillation under a reduced pressure to recover Br-terminated at one end poly butyl acrylate.

Methanol (800 ml) was fed to a flask and was cooled to 0° C. Thereto, t-butoxy potassium (130 g) was added in a few steps. The reaction mixture was maintained at 0° C., and a methanol solution of acrylic acid (100 g) was added dropwise. Upon completion of the addition, the temperature of the reaction mixture was brought back to room temperature. The volatile components of the reaction mixture were removed by distillation under a reduced pressure to recover potassium acrylate ($CH_2$=$CHCO_2K$).

A 500-mL flask with a reflux condenser was charged with the resultant Br-terminated at one end poly butyl acrylate (150 g), potassium acrylate (7.45 g), and dimethylacetoamide (150 ml). The mixture was heated at 70° C. with stirring for 3 hours. Dimethylacetoamide was distilled away from the reaction mixture, and the resulting mixture was dissolved in toluene and was passed through an activated alumina column. Toluene was removed by distillation to recover an acryloyl-terminated at one end poly butyl acrylate macromonomer. The number-average molecular weight was 6,000, and the molecular weight distribution was 1.14.

Production Example 2

An acryloyl-terminated at one end poly butyl acrylate macromonomer having a number-average molecular weight of 12,000 and a molecular weight distribution of 1.11 was synthesized as in PRODUCTION EXAMPLE 1 but with 7.2 ml of methyl 2-bromopropionate.

Production Example 3

An acryloyl-terminated at one end poly-2-ethylhexyl acrylate macromonomer having a number-average molecular weight of 12,000 and a molecular weight distribution of 1.15 was synthesized as in PRODUCTION EXAMPLE 1 except that 2-ethylhexyl acrylate was used instead of butyl acrylate.

Production Example 4

An acryloyl-terminated at one end poly n-octyl acrylate macromonomer having a number-average molecular weight of 12,000 and a molecular weight distribution of 1.10 was synthesized as in PRODUCTION EXAMPLE 1 except that n-octyl acrylate was used instead of butyl acrylate.

Example 1

<Polymerization>

A polyvinyl chloride copolymer paste resin of the present invention, i.e., a vinyl chloride/at one end poly butyl acrylate graft copolymer paste resin in particular, was synthesized as follows.

Into a fully deaerated, $N_2$-purged 15-L pressure container, were placed the acryloyl-terminated poly butyl acrylate (70 g) of PRODUCTION EXAMPLE 1, a vinyl chloride monomer (2.23 kg), α, α'-azobis-2,4-dimethylvaleronitrile (1.6 g), and stearyl alcohol (32.2 g). The mixture was homogenized for 2 minutes. An aqueous sodium lauryl sulfate (26.8 g) solution (6.9 kg) was added to the container, and the mixture was homogenized again for 3 minutes to give a monomer-dispersed liquid. The monomer-dispersed liquid was transferred to a 5-L reaction vessel. The inside of the vessel was kept at 50° C. to initiate polymerization. After approximately 6 hours, the pressure inside the vessel started to decrease. The monomers in the polymerization vessel were recovered, and the inside of the vessel was cooled. Subsequently, the latex was recovered. The conversion rate of the vinyl chloride monomers was approximately 90%. The latex was dried with a spray drier (inlet: 110° C., outlet: 50° C.) to prepare a powder of the vinyl chloride/polybutyl acrylate graft copolymer resin.

A plastisol was prepared from the resin. A tensile test and sheet heat resistance evaluation were conducted using this resin. The results are shown in Table 1.

Example 2

A resin was prepared as in EXAMPLE 1 but with 140 g of acryloyl-terminated at one end poly butyl acrylate of PRODUCTION EXAMPLE 1 and 2.16 kg of the vinyl chloride monomer. A plastisol was prepared from the resin, and a tensile test and sheet heat resistance evaluation were conducted as in EXAMPLE 1. The results are shown in Table 1.

Example 3

A resin was prepared as in EXAMPLE 1 except that the macromonomer of PRODUCTION EXAMPLE 2 was used instead of the acryloyl-terminated at one end poly butyl acrylate macromonomer. A plastisol was prepared from the resin, and a tensile test and sheet heat resistance evaluation were conducted as in EXAMPLE 1. The results are shown in Table 1.

Example 4

A resin was prepared as in EXAMPLE 1 but with 230 g of acryloyl-terminated at one end poly butyl acrylate of PRODUCTION EXAMPLE 1 and 2.07 kg of the vinyl chloride monomer. A plastisol was prepared from the resin, and a tensile test and sheet heat resistance evaluation were conducted as in EXAMPLE 1. The results are shown in Table 1.

Example 5

A resin was prepared as in EXAMPLE 1 but with 23 g of acryloyl-terminated at one end poly butyl acrylate of PRODUCTION EXAMPLE 1 and 2.28 kg of the vinyl chloride monomer. A plastisol was prepared from the resin, and a tensile test and sheet heat resistance evaluation were conducted as in EXAMPLE 1. The results are shown in Table 1.

Example 6

A resin was prepared as in EXAMPLE 1 but with 460 g of acryloyl-terminated at one end poly butyl acrylate of PRODUCTION EXAMPLE 1 and 1.84 kg of the vinyl chloride monomer. A plastisol was prepared from the resin, and a tensile test and sheet heat resistance evaluation were conducted as in EXAMPLE 1. The results are shown in Table 1.

Example 7

A resin was prepared as in EXAMPLE 1 except that the macromonomer of PRODUCTION EXAMPLE 3 was used instead of the acryloyl-terminated at one end poly butyl acrylate of PRODUCTION EXAMPLE 1. A plastisol was prepared from the resin, and a tensile test and sheet heat resistance evaluation were conducted as in EXAMPLE 1. The results are shown in Table 1.

Example 8

A resin was prepared as in EXAMPLE 1 except that the macromonomer of PRODUCTION EXAMPLE 4 was used instead of the acryloyl-terminated at one end poly butyl acrylate of PRODUCTION EXAMPLE 1. A plastisol was prepared from the resin, and a tensile test and sheet heat resistance evaluation were conducted as in EXAMPLE 1. The results are shown in Table 1.

Example 9

<Polymerization>

Into a fully deaerated, $N_2$-purged 20-L pressure container, were placed the acryloyl-terminated at one end poly butyl acrylate (820 g) of PRODUCTION EXAMPLE 1, a vinyl chloride monomer (7.43 kg), di(2-methylhexyl) peroxydicarbonate (4 g), 3,5,5-trimethylhexanoyl peroxide (2.1 g), partly saponified polyvinyl alcohol (28.8 g of partly saponified polyvinyl alcohol having a saponification value of 87 to 89 mol % and a degree of polymerization of 3,500; 1.4 g of partly saponified polyvinyl alcohol having a saponification value of 76.5 to 90 mol % and a degree of polymerization of 900), methyl cellulose (molecular weight: 30,000, 1.7 g), butyl stearate (48.5 g), and 16.5 kg of water. The mixture was stirred while the inside of the container was kept at 54° C. to initiate polymerization. After approximately 6 hours, the pressure inside the container started to decrease. The monomers in the polymerization container were recovered, and the inside of the vessel was cooled. Subsequently, the latex was recovered. The conversion rate of the vinyl chloride monomers was approximately 90%. After centrifugal drying, the latex was subjected to fluidized drying at 60° C. to prepare a vinyl chloride/poly butyl acrylate graft copolymer resin.

A vinyl chloride resin was prepared by powder-blending 70 parts of a known vinyl chloride paste resin (PSM-30; Kaneka Corporation, vinyl chloride homopolymer, K-value: 72) with 30 parts of the resultant resin. The foam properties thereof were evaluated. The results are shown in Table 3.

Example 10

A vinyl chloride resin was prepared by powder-blending 40 parts of a known vinyl chloride paste resin (PSM-30; Kaneka Corporation, vinyl chloride homopolymer, K-value: 72) with 30 parts of the vinyl chloride/poly butyl acrylate graft copolymer resin of EXAMPLE 4 and 30 parts of a known vinyl chloride blend resin (PBM-B5F; Kaneka Corporation, vinyl chloride homopolymer, K-value: 68). The foam properties thereof were evaluated. The results are shown in Table 3.

Example 11

A vinyl chloride/poly butyl acrylate graft copolymer resin was prepared as in EXAMPLE 9 but with 250 g of the acryloyl-terminated at one end poly butyl acrylate and 8 kg of the vinyl chloride monomer.

A vinyl chloride resin was prepared by powder-blending 70 parts of a known vinyl chloride paste resin (PSM-30; Kaneka Corporation, vinyl chloride homopolymer, K-value: 72) with 30 parts of the above graft copolymer resin. The foam properties thereof were evaluated. The results are shown in Table 3.

Example 12

The polymer resin of EXAMPLE 4 was used to evaluate the foam properties. The results are shown in Table 3.

Example 13

A resin prepared by drying the polymer resin latex of EXAMPLE 4 with a spray dryer (inlet: 150° C., outlet: 60° C.) was prepared to investigate cloth permeability. The results are shown in Table 4.

Example 14

A latex blend containing 60 percent by weight of the polymer resin latex of EXAMPLE 4 on a dry basis and 40 percent by weight of a known vinyl chloride latex (PSM-30; Kaneka corporation, vinyl chloride homopolymer, K value: 72) for pastemaking was prepared. The blend was spray-dried (inlet: 150° C., outlet: 60° C.) to prepare a dry resin, and a cloth permeability test was conducted. The results are shown in Table 4.

Example 15

A latex blend containing 30 percent by weight of the polymer resin latex of EXAMPLE 4 on a dry resin basis and 70 percent by weight of a known vinyl chloride latex (PSM-30; Kaneka corporation, vinyl chloride homopolymer, K value: 72) for pastemaking was prepared. The blend was spray-dried (inlet: 150° C., outlet: 60° C.) to prepare a dry resin, and a cloth permeability test was conducted. The results are shown in Table 4.

Example 16

A mixture prepared by powder blending 95 parts of a common rigid vinyl chloride resin (S1001; Kaneka Corporation, vinyl chloride homopolymer, K value: 68) and 5 parts of the copolymer of EXAMPLE 4. The mixture was pressed with rolls into a sheet. The tensile/flowability of the rigid mixture was examined. The results are shown in Table 5.

Example 17

A mixture prepared by powder-blending 80 parts of a common rigid vinyl chloride resin and 20 parts of the copolymer of EXAMPLE 4. The mixture was pressed with rolls into a sheet. The tensile/flowability of the rigid mixture was examined. The results are shown in Table 5.

Comparative Example 1

A resin was prepared as in EXAMPLE 1 but without using acryloyl-terminated at one end poly butyl acrylate. The vinyl chloride monomer content was changed to 2.30 kg. A plastisol was prepared from the resin, and a tensile test and sheet heat resistance evaluation were conducted. The results are shown in Table 2.

The sheet strength at break at 140° C. was low, and the heat resistance was poor.

Comparative Example 2

A resin was prepared as in EXAMPLE 1, but with a vinyl acetate monomer instead of the acryloyl-terminated at one end poly butyl acrylate. In particular, the vinyl acetate monomer (70 g) was used with the vinyl chloride monomer (2.23 kg). A plastisol was prepared from the resin, and a tensile test and sheet heat resistance evaluation were conducted. The results are shown in Table 2.

The heat resistance was poor.

Comparative Example 3

A resin was prepared as in EXAMPLE 1, but with a vinyl acetate monomer instead of the acryloyl-terminated at one end poly butyl acrylate in an amount twice that of the acryloyl-terminated poly butyl acrylate. In particular, the vinyl acetate monomer (140 g) was used with the vinyl chloride monomer (2.16 kg). A plastisol was prepared from the resin, and a tensile test and sheet heat resistance evaluation were conducted. The results are shown in Table 2.

The viscosity was excessively high. The stability and the heat resistance were poor.

Comparative Example 4

A resin was prepared as in EXAMPLE 1, but with a butyl acrylate monomer instead of the acryloyl-terminated at one end poly butyl acrylate. In particular, the butyl acrylate monomer (70 g) was used with the vinyl chloride monomer (2.23 kg). A plastisol was prepared from the resin, and a tensile test and sheet heat resistance evaluation were conducted. The results are shown in Table 2. The heat resistance was poor.

Comparative Example 5

A resin was prepared as in EXAMPLE 1, but with a methyl methacrylate/butyl methacrylate/styrene copolymer resin instead of the acryloyl-terminated at one end poly butyl acrylate. In particular, the methyl methacrylate/butyl methacrylate/styrene copolymer resin (230 g) was used with the vinyl chloride monomer (2.07 kg). A plastisol was prepared from the resin, and a tensile test and sheet heat resistance evaluation were conducted. The results are shown in Table 2.

The viscosity was excessively high. Stable storage in the plastisol form was impossible. The tensile strength at low temperature was poor.

Comparative Example 6

A resin was prepared by blending the vinyl chloride resin of COMPARATIVE EXAMPLE 1 with 6 parts of a solution prepared by dissolving poly t-butyl acrylate having Mn=40,000 in toluene (poly t-butyl acrylate/toluene=30%/70%). A plastisol was prepared from the resin, and a tensile test and sheet heat resistance evaluation were conducted. The results are shown in Table 2. The tensile strength at low temperature was low.

Comparative Example 7

The polymer resin of COMPARATIVE 1 was used to evaluate the foam properties. The results are shown in Table 3. The sol viscosity was high, and scale wrinkles resulting from flattening during re-heating occurred.

Comparative Example 8

The foam properties were evaluated using 70 parts of a known vinyl chloride resin used for paste making (PSM-30; Kaneka Corporation, vinyl chloride homopolymer, K value: 72)) and 30 parts of a known vinyl chloride resin used for blending (PBM-B5F, Kaneka Corporation, vinyl chloride homopolymer, K value: 68). The results are shown in Table 3. The state of cells was poor, and scale wrinkles resulting from re-heating occurred.

Comparative Example 9

The foam properties were evaluated using the polymer resin of COMPARATIVE EXAMPLE 3. The results are shown in Table 3. The viscosity was high, the expansion ratio was low, and permanent set occurred during re-heating.

Comparative Example 10

The foam properties were evaluated using the polymer resin of COMPARATIVE EXAMPLE 4. The results are shown in Table 3. The viscosity was high, the expansion ratio was low, and permanent set occurred during re-heating.

Comparative Example 11

A mixture of 100 parts of the polymer resin of COMPARATIVE EXAMPLE 1 and 9 parts of a toluene solution (polymer concentration: 30%) of a poly t-butyl acrylate (Mn=40,000) was used to evaluate the foam properties. The results are shown in Table 3. A significantly large amount of scale wrinkles occurred.

Comparative Example 12

The polymer resin latex of COMPARATIVE EXAMPLE 1 was dried in a spray dryer (inlet: 150° C., outlet: 60° C.), and the cloth permeability was evaluated. The results are shown in Table 4. The gel permeability and the permeability at room temperature were notably poor.

Comparative Example 13

The polymer resin latex of COMPARATIVE EXAMPLE 3 was dried in a spray dryer (inlet: 150° C., outlet: 60° C.), and the cloth permeability was evaluated using the dried resin. The results are shown in Table 4. The gel permeability and the permeability at room temperature were notably poor.

Comparative Example 14

A mixture was prepared by powder-blending 60 parts of the polymer resin of EXAMPLE 13 and 40 parts a known vinyl chloride resin used for paste making (PSM-30, Kaneka Corporation, vinyl chloride homopolymer, K value: 72). The cloth permeability was evaluated. The results are shown in Table 4.

The gel permeability and the permeability at room temperature were notably poor.

Comparative Example 15

A common rigid vinyl chloride resin (S1001; Kaneka Corporation, vinyl chloride homopolymer, K value: 68) alone was pressed with rolls into a sheet. The tensile/flowability of a rigid mixture containing this resin was examined. The results are shown in Table 5.

The modulus of elasticity did not decrease sufficiently, and the flow value was low. No plasticizing effect was achieved.

Comparative Example 16

A rigid vinyl chloride copolymer resin (TAE200, Mitsui Chemicals, Inc., contains 7% butyl acrylate) alone was pressed with rolls into a sheet. The tensile/flowability of a rigid mixture containing this resin was examined. The results are shown in Table 5.

The flow value was low, i.e., flowability was poor.

Comparative Example 17

A mixture prepared by powder blending 95 parts of a known rigid vinyl chloride resin (S1001; Kaneka Corporation, vinyl chloride homopolymer, K value: 68) and 5 parts of DOP. The mixture was pressed with rolls into a sheet. The tensile/flowability of a rigid mixture containing this resin was examined. The results are shown in Table 5.

Antiplasticization occurred, the modulus of elasticity was high, and the elongation was low.

Comparative Example 18

A mixture prepared by blending 90 parts of a known rigid vinyl chloride resin (S1001; Kaneka Corporation, vinyl chloride homopolymer, K value: 68) and 5 parts of DOP. The mixture was pressed with rolls into a sheet. The tensile/flowability of a rigid mixture containing this resin was examined. The results are shown in Table 5.

Antiplasticization occurred, the modulus of elasticity was high, and the elongation was low.

<Method for Making the Plastisol and Evaluation of the Plastisol>

A resin was prepared by mixing each of the vinyl chloride resins of EXAMPLES 1 to 8 and COMPARATIVE EXAMPLES 1 to 5 (100 parts) with a plasticizer (di-n-octyl phthalate (DOP): 70 parts) and a stabilizer (AC-311, Asahi Denka Co., Ltd.: 3 parts) using an Ishikawa kneader for 10 minutes. The mixture was defoamed under a reduced pressure to prepare the plastisol.

While the resultant plastisol was kept in a 40° C. thermostat, the viscosities after one hour and after 24 hours were measured using a Brookfield viscometer (Type BM, manufactured by Tokyo Seiki Co., Ltd.) with a number 4 rotor at a rotor speed of 6 rpm. The ratio of viscosity increase, i.e., "viscosity after 24 hours/viscosity after 1 hour", was calculated. The lower the ratio of the viscosity increase, the longer the pot life and higher the long-term stability.

<Evaluation of Tensile Properties>

The plastisol was applied on a glass plate to a thickness of approximately 200 μm and was heated in an oven (120° C. or 140° C., 10 min) to prepare a sheet. The sheet was cut into a JIS dumbbell No. 3 specimen, and the specimen was subjected to a tensile test at 100 mm/min using an autograph (AGS-100A, manufactured by Shimadzu Corporation) to examine the tensile strength at break (TSb).

If sufficiently high strength is exhibited in a 120 to 140° C. temperature range, which is lower than typical shaping conditions for vinyl chloride, processing under low-temperature shaping conditions becomes possible, which is preferable.

<Evaluation of the Sheet Heat Resistance>

The plastisol was applied on a glass plate to a thickness of approximately 200 μm and was heated in an oven (140° C., 10 min) to prepare a sheet. The sheet was placed on a glass plate and heated again in an oven (140° C.). The sheet was removed from the oven every minute to determine the initial coloring (blackening) time of the sheet. When the time taken for the sheet to undergo initial coloring (hereinafter, referred to as the "initial coloring time") is long, the sheet suffers less from coloring and a decrease in strength due to thermal degradation of the resin.

<Evaluation of Foam Properties>

The plastisol was prepared by mixing 100 parts of each of the vinyl chloride resins of EXAMPLES 9 to 12 and COMPARATIVE EXAMPLES 7 to 9, 48 parts of a plasticizer (DOP), 1 part of epoxidized vegetable oil (O-130P, Asahi Denka Co., Ltd.), 1.5 parts of zinc oxide, 2.4 parts of ADCA (AC-3C #K2, Eiwa Chemical Ind. Co., Ltd.), 8 parts of titanium oxide (JR-600A, Tayca Corporation), 40 parts of calcium carbonate (Whiton-H, Shiraishi Calcium Co., Ltd.), and 2 parts of a viscosity reducing agent (Shellsol S, Shell Chemicals Japan) with a dissolver (for 3 min at 1,000 rpm). The plastisol was applied on a plain paper (Kishu Paper Co., Ltd.) to a thickness of approximately 300 μm. The paper was passed through an infrared oven (furnace temperature: 140° C., time: approximately 20 sec) to prepare a semicured stock.

The semicured stock was cut to 30 cm by 15 cm. The cut semicured stock was placed in a hot-air oven (PHH-100, Tabai Espec Corporation) heated to 220° C. and was removed from the oven after 50 seconds to prepare a foam.

The expansion ratio of the foam was calculated by determining the foam, and the rate of the closed cells in the foam was measured with an air pycnometer (manufactured by Beckman Instruments Inc.).

The fineness and uniformity of the cells were visually observed from a cross-section of the foam.

Furthermore, the foam was heated again in an infrared oven (furnace temperature: 160° C., time: approximately 15 sec), and was pressed with an embossing roller immediately after the heating so as to visually observe the degree of flattening of the foam.

The flattening is a phenomenon in which scale wrinkles are produced on surfaces of the foam caused by successive flattening of the cells due to embossing. The state of flattening was evaluated by visual observation.

The expansion ratio of the foam is preferably high and the cells are preferably dense and uniform so that degradation in quality, i.e., a decrease in expansion ratio resulting from secondary processing (re-heating) of the foam and a decrease in the embossability (pattern reproducibility) can be prevented.

The visual observation of the cross-section of the foam was made using ElectroMicroscope equipped with CCD camera [PRODUCT of Keyence Co., Ltd:VH-6200].

<Evaluation of Cloth Permeability>

The plastisol was prepared by mixing 100 parts of each of the vinyl chloride resins of EXAMPLES 13 to 15 and COMPARATIVE EXAMPLES 10 to 12, 120 parts of a plasticizer (DOP), and 3 parts of a stabilizer (AC-311, Asahi Denka Co., Ltd.) using an Ishikawa kneader for 10 minutes. The resulting mixture was defoamed under a reduced pressure to prepare the plastisol.

Approximately 3 g of the plastisol was placed on a knit fabric and the state of permeation of the plastisol on still standing was observed over time.

On the other hand, approximately 3 g of the plastisol was placed on a knit fabric and was immediately placed in a hot-air oven (PHH-100, manufactured by Tabai Corporation) heated to 180° C. to gelate the plastisol. The state of the plastisol permeating into the fabric during heating was observed. The gelated product was scratched with nails to comparatively examine the peeling ease.

A gelated product showing less permeation into the fabric and higher peeling ease is suitable for use in canvases and gloves since it feels good to the touch and has high strength.

<Evaluation of Tensile/Flowability of a Rigid Mixture>

A mixture was prepared by kneading 100 parts of the resin, 1.5 parts of a stabilizer (#8831, Nitto Kasei Co., Ltd.), and 0.5 part of a higher alcohol (CA-86; Kao Corporation). The mixture was rolled (185° C., 5 min) and pressed (190° C., 10 min) to prepare a pressed sheet approximately 1 mm in thickness. The sheet was cut into a dumbbell piece, and a tensile test was performed with an autograph at 100 mm/min.

A method B flow test (load: 100 kg) was performed on a pulverized pressed sheet. In the tensile test, the modulus of elasticity is preferably low and the elongation at break is preferably high to facilitate the internal plasticization of the resin. The method B flow is preferably high since flowability during working can be improved.

TABLE 1

| Acryloyl-terminated poly(ester acrylate) | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| | Vinyl chloride/poly(ester acrylate) graft copolymer resin | | | | | | | |
| | PRODUCTION EXAMPLE 1 | PRODUCTION EXAMPLE 1 | PRODUCTION EXAMPLE 2 | PRODUCTION EXAMPLE 1 | PRODUCTION EXAMPLE 1 | PRODUCTION EXAMPLE 1 | PRODUCTION EXAMPLE 3 | PRODUCTION EXAMPLE 4 |
| Molecular weight | 6,000 | 6,000 | 12,000 | 6,000 | 6,000 | 6,000 | 12,000 | 12,000 |
| Compounding ratio | 97/3 | 94/6 | 97/3 | 90/10 | 99/1 | 80/20 | 97/3 | 97/3 |
| Rate of viscosity increase | 20% | 80% | 40% | 120% | 40% | 230% | 25% | 35% |
| Tensile test: 120° C. | 3.2 MPa | 3.3 MPa | 2.5 MPa | 3.8 MPa | 2.7 MPa | 4.1 MPa | 3.3 MPa | 3.5 MPa |
| Tensile test: 140° C. | 6.4 MPa | 6.6 MPa | 6.0 MPa | 7.9 MPa | 4.6 MPa | 8.2 MPa | 7.5 MPa | 7.8 MPa |
| Initial coloring (heat resistance) | 9 min | 9 min | 9 min | 9 min | 8 min | 10 min | 9 min | 9 min |

TABLE 2

| | COMPARATIVE EXAMPLE 1 Vinyl chloride resin | COMPARATIVE EXAMPLE 2 Vinyl chloride/vinyl acetate copolymer resin | COMPARATIVE EXAMPLE 3 Vinyl chloride/vinyl acetate copolymer resin | COMPARATIVE EXAMPLE 4 Butyl acrylate copolymer resin | COMPARATIVE EXAMPLE 5 Polymer blend of Vinyl chloride resin and MMA/BMA/St copolymer resin | COMPARATIVE EXAMPLE 6 Mixture of vinyl chloride resin and poly butyl acrylate |
|---|---|---|---|---|---|---|
| Compounding ratio | 100 | 97/3 | 94/6 | 97/3 | 90/10 | 98/2 |
| Ratio of viscosity increase | 50% | 100% | 1620% excessively high viscosity | 70% | Undetectable gelated | 50% |
| Tensile test: 120° C. | 2.4 MPa | 3.5 MPa | 6.7 MPa | 2.7 MPa | 1.4 MPa | 1.9 MPa |
| Tensile test: 140° C. | 4.1 MPa | 8.8 MPa | 8.9 MPa | 5.2 MPa | 2.0 MPa | 3.2 MPa |
| Initial coloring (heat resistance) | 6 min | 5 min | 5 min | 4 min | 6 min | 7 min |

*In COMPARATIVE EXAMPLE 5, the compound ratio of MMA/BMA/St = 38/23/39, Mn = 200,000.
*In COMPARATIVE EXAMPLE 6, poly butyl acrylate had Mn = 40,000.
*Ratio of viscosity increase = (viscosity after 24 hours/viscosity after 1 hour); plastisol maintained at 40° C.

TABLE 3

| | Ex. 9 | Ex. 10 | Ex. 11 | Ex. 12 | C. Ex. 7 | C. Ex. 8 | C. Ex. 9 | C. Ex. 10 | C. Ex. 11 |
|---|---|---|---|---|---|---|---|---|---|
| Paste resin | PSM-30: 70 | PSM-30: 40 Ex. 4: 30 | PSM-30: 70 | Ex. 4: 100 | C. Ex. 1 | PSM-30: 70 | C. Ex. 3 | C. Ex. 4 | C. Ex. 1: 100 p-BA addition: 2.7 |
| Blend resin | 10% BA macromonomer graft copolymer: 30 | PBM-B5F: 30 | 3% BA macromonomer graft copolymer: 30 | | | PBM-B5F: 30 | | | |
| Sol viscosity | 6.8 Pa · s | 7.5 Pa · s | 5.6 Pa · s | 10.0 Pa · s | 12.3 Pa · s | 7.0 Pa · s | 25.0 Pa · s | 27.0 Pa · s | 12.3 Pa · s |
| Expansion ratio | 5.3 | 5.6 | 5.1 | 5.6 | 5.6 | 5.2 | 3.2 | 3.4 | 5.5 |
| Rate of closed cell | 27% | 35% | 17% | 42% | 35% | 25% | 0% | 0% | 35% |
| Evaluation of cells | B | A | B | A | B | C | D (flattened) | D (flattened) | A |

TABLE 3-continued

Figure 2:
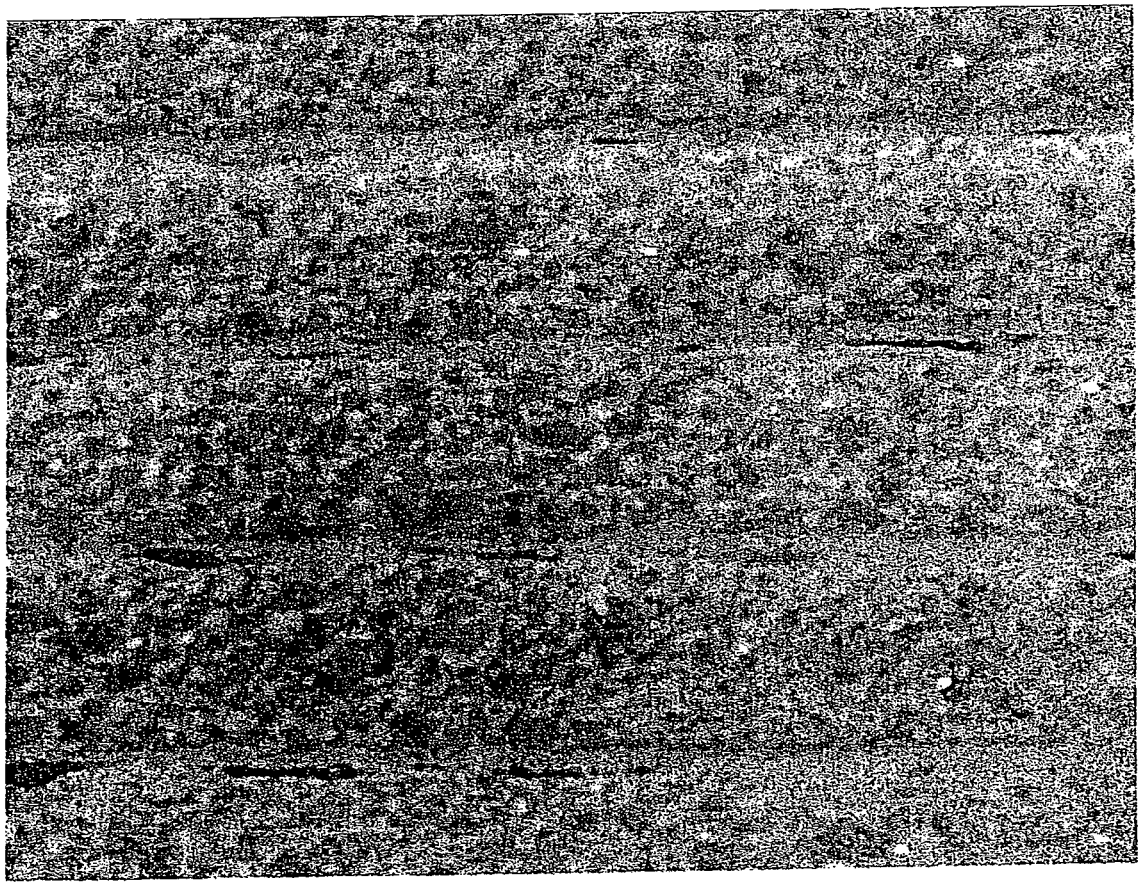
FIG. 2 is a cross-sectional photograph of a sheet of EXAMPLE 10 for evaluating the foaming properties.
Figure 3:
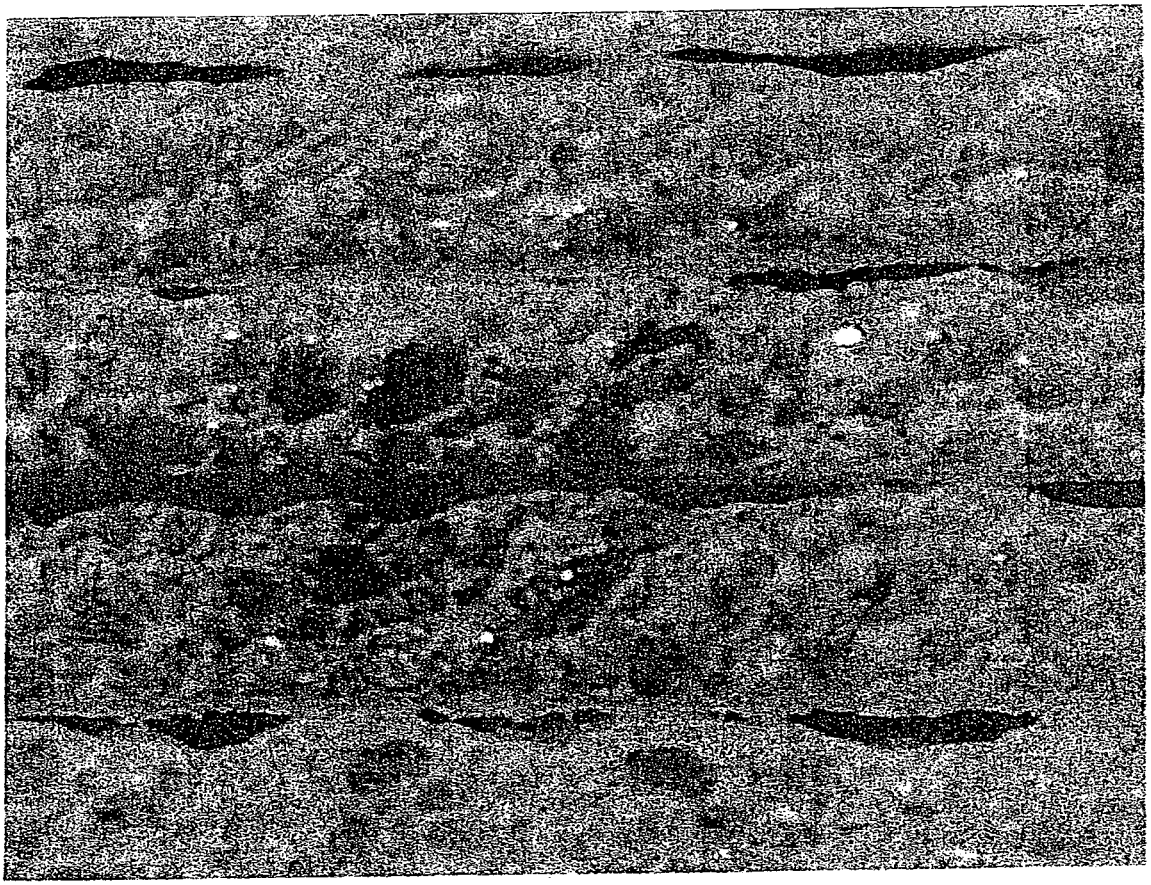
FIG. 3 is a cross-sectional photograph of a sheet of EXAMPLE 11 for evaluating the foaming properties.
Figure 4:
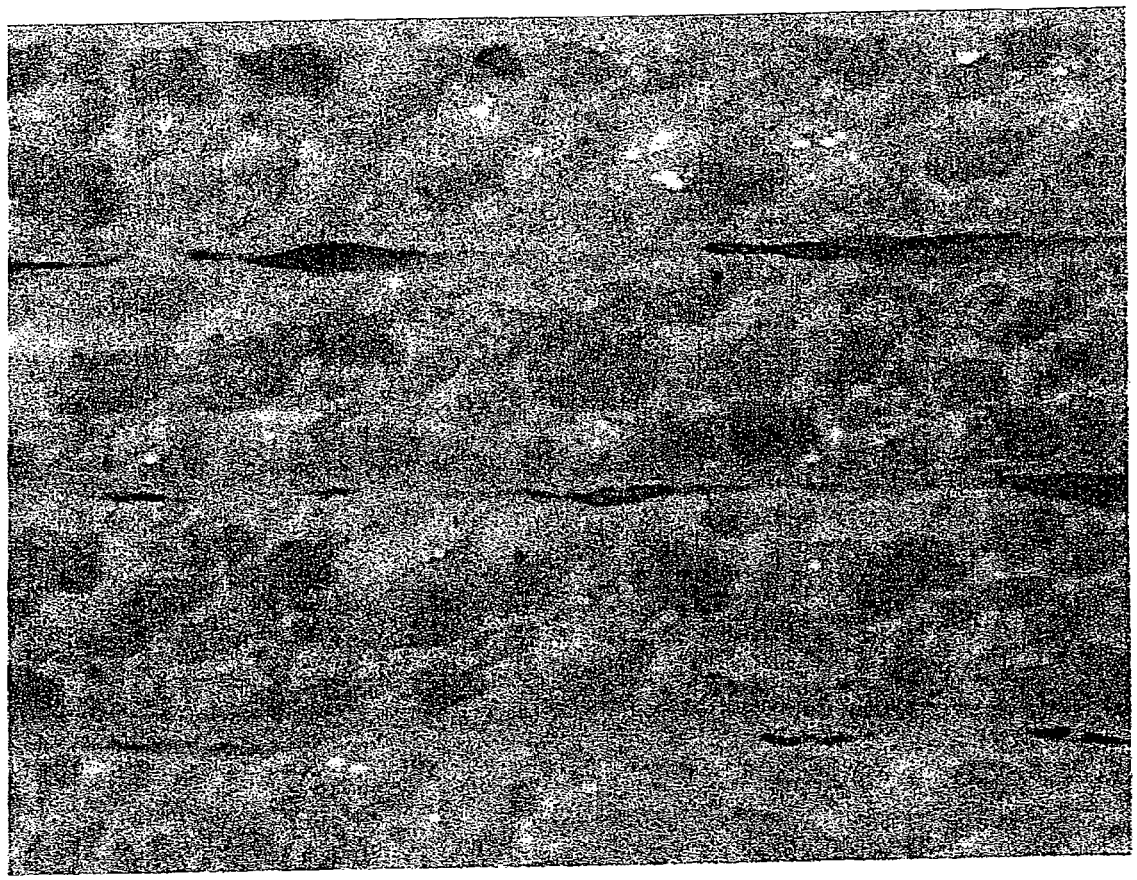
FIG. 4 is a cross-sectional photograph of a sheet of EXAMPLE 12 for evaluating the foaming properties.
Figure 5:
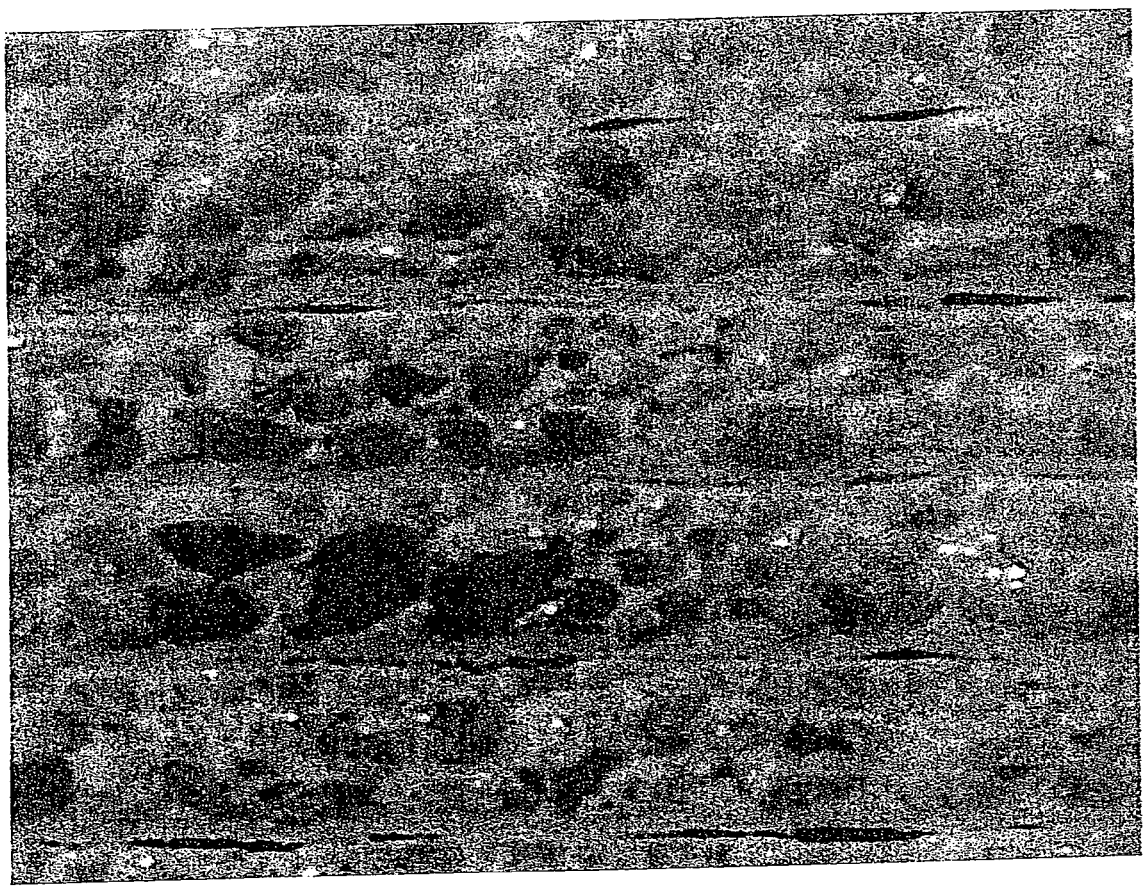
FIG. 5 is a cross-sectional photograph of a sheet of COMPARATIVE EXAMPLE 7 for evaluating the foaming properties.
Figure 6:
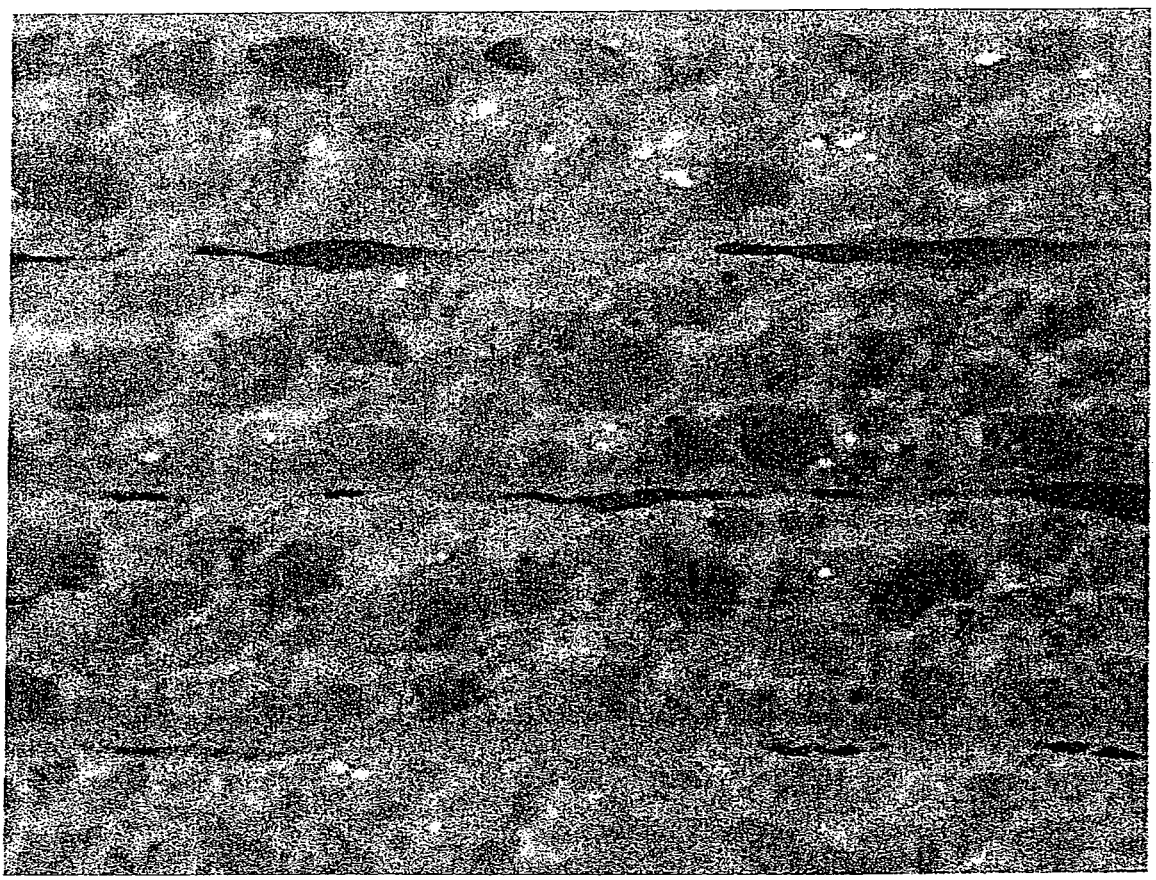
FIG. 6 is a cross-sectional photograph of a sheet of COMPARATIVE EXAMPLE 8 for evaluating the foaming properties.
Figure 7:
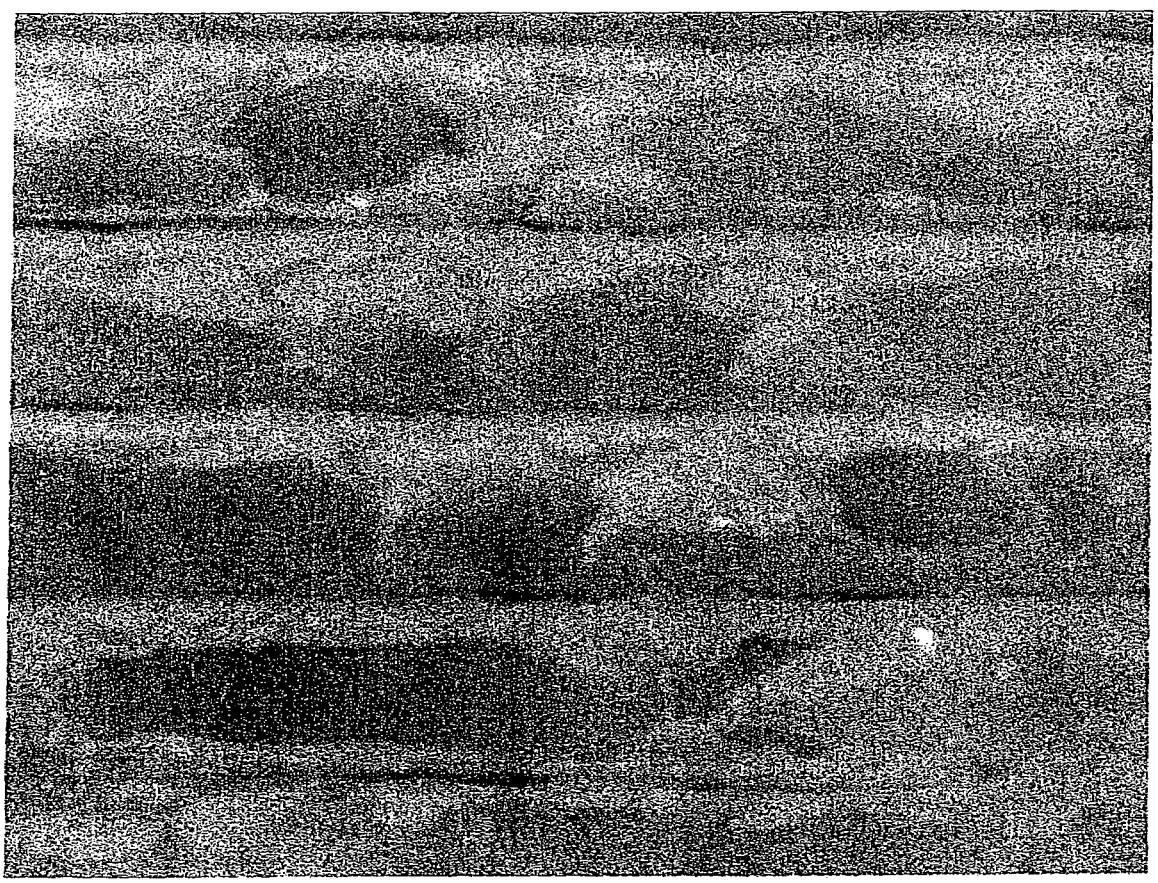
FIG. 7 is a cross-sectional photograph of a sheet of COMPARATIVE EXAMPLE 9 for evaluating the foaming properties.
Figure 8:
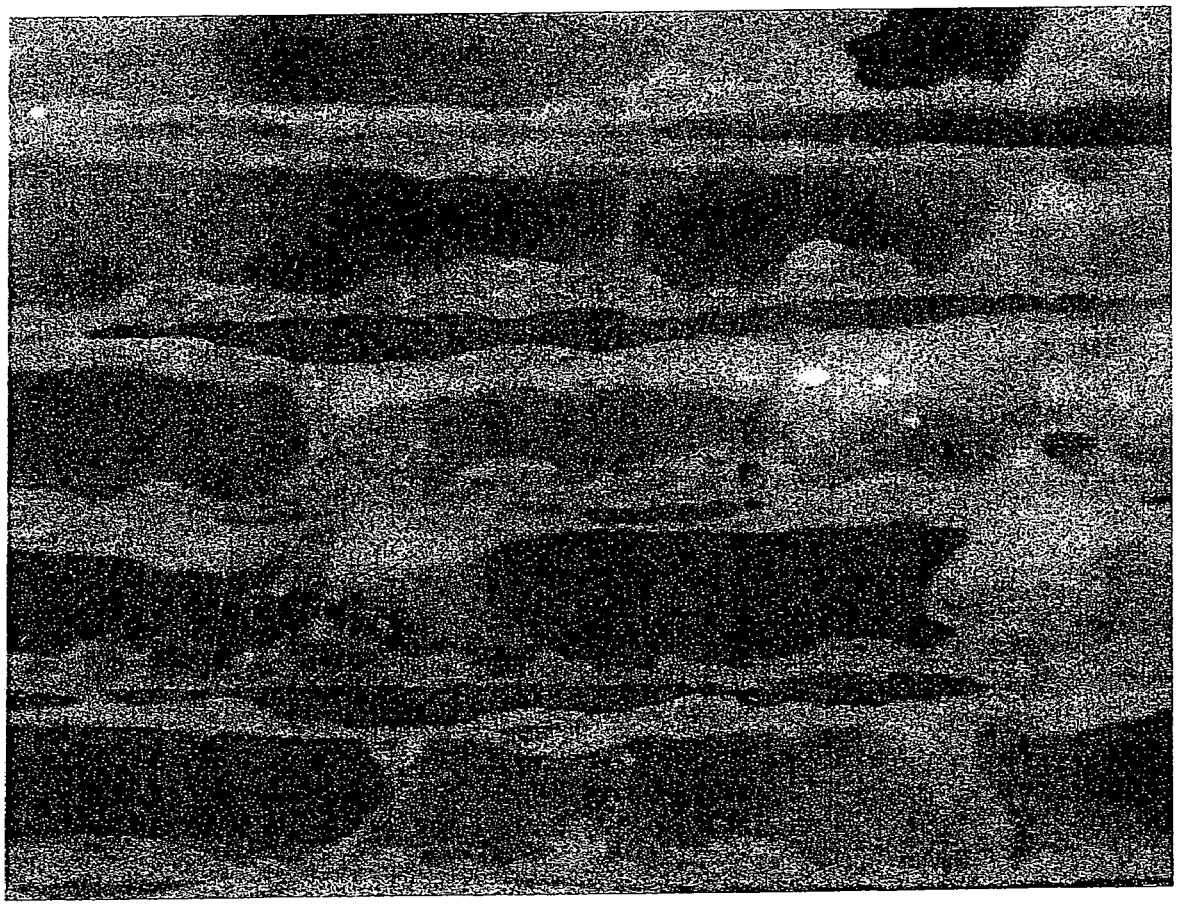
FIG. 8 is a cross-sectional photograph of a sheet of COMPARATIVE EXAMPLE 10 for evaluating the foaming properties.
Figure 9:
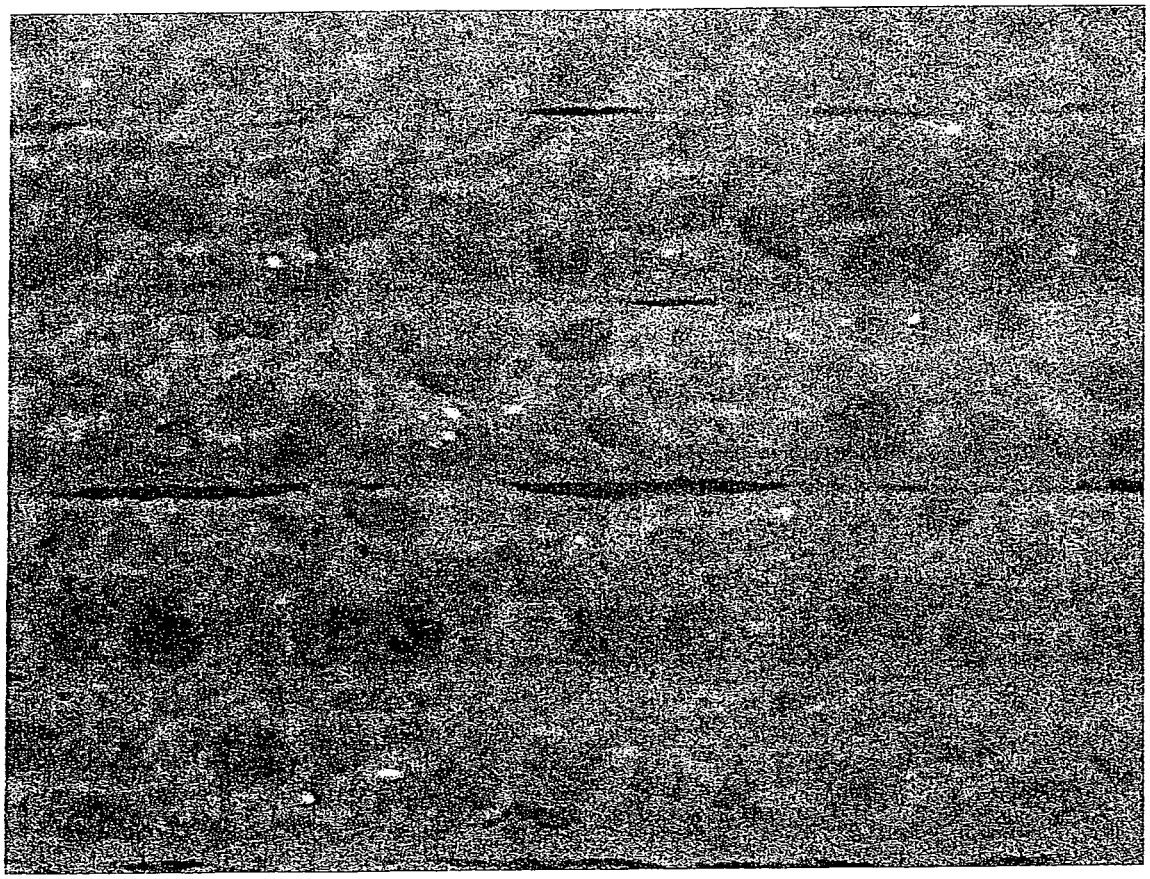
FIG. 9 is a cross-sectional photograph of a sheet of COMPARATIVE EXAMPLE 11 for evaluating the foaming properties.

|  | Ex. 9 | Ex. 10 | Ex. 11 | Ex. 12 | C. Ex. 7 | C. Ex. 8 | C. Ex. 9 | C. Ex. 10 | C. Ex. 11 |
|---|---|---|---|---|---|---|---|---|---|
| Section photograph of foam | FIG. 1 | FIG. 2 | FIG. 3 | FIG. 4 | FIG. 5 | FIG. 6 | FIG. 7 | FIG. 8 | FIG. 9 |
| Flattening | A | A | A | A | B | B | — (flat) | — (flat) | C |

*Ex.: EXAMPLE, C. Ex: COMPARATIVE EXAMPLE
*Evaluation of cells: A: small and uniform; B: large but uniform; C: small but nonuniform; D: large and nonuniform
*Evaluation of flattening: A: no scale wrinkles; B: small scale wrinkles; C: large scale wrinkles.

TABLE 4

| Mixing conditions | EXAMPLE 13 EXAMPLE 4 | EXAMPLE 14 EXAMPLE 4: 60 PSM-30: 40 | EXAMPLE 15 EXAMPLE 4: 30 PSM-30: 70 Latex blend | COMPARATIVE EXAMPLE 12 COMPARATIVE EXAMPLE 1 | COMPARATIVE EXAMPLE 13 COMPARATIVE EXAMPLE 3 | COMPARATIVE EXAMPLE 14 EXAMPLE 13: 60 PSM-30: 40 Powder blend |
|---|---|---|---|---|---|---|
| Gel permeability | A | A | A | C | C | C |
| Adhesiveness | A | A | A | Undetectable | Undetectable | Undetectable |
| Still standing after 5 min | A | A | A | C | C | C |
| Still Standing after 60 min | A | A | B | C | C | C |

Permeability: A: no permeation to back of cloth, B: slight bleeding of plasticizer, C: permeation of sol found on back of cloth
Adhesiveness: A: gel product tightly adhered on cloth, B: some gel product detached by scratching, C: whole gel product easily separated by scratching

TABLE 5

|  | EXAMPLE 16 | EXAMPLE 17 | COMPARATIVE EXAMPLE 15 | COMPARATIVE EXAMPLE 16 | COMPARATIVE EXAMPLE 17 | COMPARATIVE EXAMPLE 18 |
|---|---|---|---|---|---|---|
| Dry resin | S1001: 95 Ex. 4: 5 | S1001: 80 Ex. 4: 20 | S1001: 100 | TAE200: 100 (BA 7%) | S1001: 95 DOP: 5 | S1001: 90 DOP: 10 |
| Tensile test |  |  |  |  |  |  |
| Modulus of elasticity [MPa] | 1940 | 840 | 2300 | 1780 | 2450 | 2250 |
| Elongation at break [%] | 129% | 132% | 122% | 136% | 82% | 127% |
| Method B flow [cc/sec × 10E-2] | 1.2 | 60.1 | 0.7 | Undetectable | 2.1 | 7.6 |

Ex. = EXAMPLE

INDUSTRIAL APPLICABILITY

According to the present invention, a polyvinyl chloride copolymer paste resin having superior tensile properties in low-temperature working conditions can be easily synthesized. A plastisol made from the resin has superior gelation properties and storage stability.

The invention claimed is:
1. A plastisol, comprising a copolymer of a vinyl chloride monomer represented by the formula $CH_2=CHCl$ and a macromonomer having a vinyl polymer main chain.
2. The plastisol according to claim 1, wherein the polymer main chain of the macromonomer is prepared by living radical polymerization.
3. The plastisol according to claim 1, wherein the macromonomer having the vinyl polymer main chain has at least one group containing a polymerizable carbon-carbon double bond at an end of the monomer.
4. The plastisol according to claim 3, wherein the macromonomer having the vinyl polymer main chain and having at least one group containing a polymerizable carbon-carbon double bond at the end of the molecule, is synthesized by radical polymerization.
5. The plastisol according to claim 3, wherein the group containing the polymerizable carbon-carbon double bond has a structure represented by the general formula:

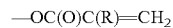

(wherein R represents hydrogen or a C1-C20 organic group).
6. The plastisol according to claim 5, wherein R represents hydrogen or a methyl group.
7. The plastisol according to claim 1, wherein the polymer main chain of the macromonomer is a (meth)acrylic polymer.
8. The plastisol according to claim 1, wherein the polymer main chain of the macromonomer is a (meth)acrylic ester polymer.
9. The plastisol according to claim 1, wherein the polymer main chain of the macromonomer is an acrylic ester polymer.
10. The plastisol according to claim 1, wherein the ratio (Mw/Mn) of the weight-average molecular weight (Mw) to the number-average molecular weight (Mn) of the macromonomer having the vinyl polymer main chain is less than 1.8.
11. The plastisol according to claim 1, wherein the glass transition temperature of the macromonomer having the vinyl polymer chain is −20° C. or less.

12. The plastisol according to claim 1, wherein the copolymer contains 80 to 99.95 percent by weight of the vinyl chloride monomer and 20 to 0.05 percent by weight of the macromonomer having the vinyl polymer main chain.

13. The plastisol according to claim 1, wherein the copolymer is polymerized by aqueous polymerization.

14. The plastisol according to claim 13, wherein the aqueous polymerization is emulsion polymerization, suspension polymerization, or microsuspension.

15. A plastisol comprising (A), (B), and (C):
  (A) 100 parts by weight of a vinyl chloride polymer containing
    20 to 100 percent by weight of a copolymer of vinyl chloride monomer represented by the formula $CH_2=CHCl$ and a macromonomer having a vinyl polymer main chain, and
    80 to 0 percent by weight of a vinyl chloride homopolymer resin;
  (B) 30 to 200 parts by weight of a plasticizer; and
  (C) 0 to 500 parts by weight of a filler.

16. The plastisol according to claim 15, further comprising 0.1 to 10 parts by weight of a chemical foaming agent.

17. The plastisol according to claim 15, wherein the plastisol is applied for canvas or glove applications, and the vinyl chloride polymer (A) is prepared by drying an aqueous dispersion mixture of
  20 to 100 percent by weight of a copolymer of a vinyl chloride monomer of a vinyl chloride monomer represented by the formula $CH_2=CHCl$ and a macromonomer having a vinyl polymer main chain, and
  80 to 0 percent by weight of a vinyl chloride homopolymer resin.

18. A polyvinyl chloride copolymer resin, comprising a copolymer of a vinyl chloride monomer and a macromonomer having a vinyl polymer main chain, wherein the vinyl polymer main chain of the macromonomer is prepared by living radical polymerization, and
  wherein the copolymer contains 80 to 99.95 percent by weight of the vinyl chloride monomer and 20 to 0.05 percent by weight of the macromonomer having the vinyl polymer main chain.

19. A plastisol exhibiting ready gelation and high storage stability, the plastisol comprising (A), (B), and (C):
  (A) 100 parts by weight of a vinyl chloride polymer containing
    20 to 100 percent by weight of a polyvinyl chloride copolymer resin comprising a copolymer of a vinyl chloride monomer and a macromonomer having a vinyl polymer main chain, and
    80 to 0 percent by weight of a vinyl chloride homopolymer resin;
  (B) 30 to 200 parts by weight of a plasticizer;
  (C) 0 to 500 parts by weight of a filler; and
  (D) 0.1 to 10 parts by weight of a chemical foaming agent, wherein the plastisol is heated to form uniform microcells, whereby the plastisol further exhibits excellent foam properties.

20. A polyvinyl chloride copolymer resin, comprising a copolymer of a vinyl chloride monomer and a macromonomer having a vinyl polymer main chain, wherein the vinyl polymer main chain of the macromonomer is a (meth)acrylic polymer, and
  wherein the copolymer contains 80 to 99.95 percent by weight of the vinyl chloride monomer and 20 to 0.05 percent by weight of the macromonomer having the (meth)acrylic polymer main chain.

* * * * *